United States Patent
Eddins et al.

(10) Patent No.: US 8,930,881 B1
(45) Date of Patent: Jan. 6, 2015

(54) DUAL PROGRAMMING INTERFACE

(75) Inventors: Steven Eddins, Milford, MA (US);
Michelle T. Hirsch, Westborough, MA (US); Loren Shure, Brookline, MA (US); Joseph F. Hicklin, Upton, MA (US); John Norris Little, Sherborn, MA (US); Portia O'Callaghan, Natick, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 13/490,228

(22) Filed: Jun. 6, 2012

Related U.S. Application Data

(60) Provisional application No. 61/494,254, filed on Jun. 7, 2011.

(51) Int. Cl.
*G06F 9/44* (2006.01)

(52) U.S. Cl.
USPC ........... 717/100; 717/101; 717/108; 717/112; 717/114; 717/136; 717/137; 717/142; 717/143

(58) Field of Classification Search
None
See application file for complete search history.

(56) References Cited

U.S. PATENT DOCUMENTS

| | | | |
|---|---|---|---|
| 7,657,873 B2 | 2/2010 | Horton et al. | |
| 2006/0265415 A1* | 11/2006 | Abrams et al. | 707/102 |
| 2008/0141238 A1* | 6/2008 | Balassanian | 717/172 |
| 2010/0088686 A1* | 4/2010 | Langworthy et al. | 717/143 |
| 2010/0095282 A1* | 4/2010 | Thunemann | 717/137 |
| 2011/0167248 A1* | 7/2011 | Gafter et al. | 712/242 |

OTHER PUBLICATIONS

Steven C. McConnell, "Chapter 11: The Power of Variable Names" from *Code Complete 2nd Edition*, Jan. 13, 2004, © 2004, 33 pages.
Richard K. Johnson, "Chapter 3: Naming" from *Elements of MATLAB Style*, © 2011, pp. 18-48.

* cited by examiner

*Primary Examiner* — Don Wong
*Assistant Examiner* — Roberto E Luna
(74) *Attorney, Agent, or Firm* — Harrity & Harrity, LLP

(57) ABSTRACT

A computer-implemented method for providing an informal interface and a formal interface to a computing application using a computer is provided. The informal interface includes first routines, the first routines using an informal input format. The method also includes providing a formal interface using the computer, where the formal interface includes second routines. The second routines support developer functionality, and the second routines using a formal input format. The method includes receiving a first input having a first routine input format, the first routine input format complying with the informal input format, or a second input having a second routine input format, the second routine input format complying with the formal input format. The method includes processing the received first input or the received second input and performing a computing operation based on the processing.

34 Claims, 18 Drawing Sheets

| Interface Element | Informal Interface | Formal Interface |
|---|---|---|
| Functions and Methods | Lower case short<br>e.g., eig, cellplot, bdroot, chebwin<br>-OR-<br>camelCase Full<br>e.g., closeDialog, restoreDefaultPath, matchFeatures, traverseGraph | camelCase Full (in package)<br>Note: matlab is the package identifier<br>e.g.,<br>matlab.system.isSystemObject<br>matlab.editor.getActiveFilename |
| Class | Lower case short<br>e.g., strel, ss, sym<br>-OR-<br>camelCase Full<br>e.g., griddedInterpolant | MixedCase Full (in package)<br>e.g.,<br>matlab.ui.eventdata.MouseData<br>matlab.graphics.mixin.Selectable |
| Property | MixedCase Full<br>e.g., Connectivity, CornerThreshold, ScaleLimits, ServerURL, HasOutputPort, IsEditable, CatureDiary, ShowLineNumbers | Same as informal interface |
| Package | Not used | Lower case short<br>e.g.,<br>matlab.graphics.primitive<br>vision.video<br>map.interval |

FIG. 8

```
% Create and set the current stream
s = matlab.base.RandomNumberStream('mt19937ar','seed',0);
matlab.base.RandomNumberStream.setGlobalStream(s);

% Save the state of s so we can use it again
savedState = s.State;

% Call rand to generate a vector of random values
xf = rand(1,5);

% Call rand again to see that you get a different vector of random values
yf = rand(1,5);

% Restore the original generator settings, and generate a new
% set of random values and verify that x and z are equal.
s.State = savedState;
zf = rand(1,5);

% Check that zf and zf are equal
isequal(xf,zf)
```

FIG. 11B

| | |
|---|---|
| `files = dir('*.m');` | Find all the files in the current directory that end with ".m". |
| `for k = 1:numel(files)` | For each such file: |
| `name = files(k).name;` | Find the name of the file |
| `doc = matlab.desktop.editor.openDocument(name);` | Call the openDocument function in the MATLAB Editor API (a formal interface) to load the file into the MATLAB Editor. openDocument returns an object of the class matlab.desktop.editor.Document. |
| `doc.smartIndentContents();` | Invoke the smartIndentContents method of the matlab.desktop.editor.Document object. This applies smart indenting to the corresponding document loaded in the Editor. |
| `doc.save();` | Invoke the save method of the matlab.desktop.editor.Document object. This saves the changes made to the corresponding document loaded in the Editor. |
| `doc.close();` | Invoke the close method of the matlab.desktop.editor.Document object. This removes the corresponding document from the Editor and closes the corresponding document window. |
| `end` | |

| | |
|---|---|
| `function str = toHtml(this_obj, level)` | Function toHtml is a method that produces HTML text that describes the object. |
| `lines = matlab.containers.Deque;` | A double-ended queue (deque) is used to hold the HTML text as it is built up. The deque object is presented as a Formal Interface. |
| `if level == 1` | |
| `  lines.pushBack('<h2>ColorTransformFunction Description</h2>');` | At the outermost level of the description (level 1), push an <h2> heading line onto the end (back) of the deque. |
| `  addSummaryTable(lines, self);` | Call the function addSummaryTable, which puts an HTML table onto the end of the deque. |
| `end` | |
| `lines.pushBack(this_obj.Description);` | Put this object's own Description property onto the end of the deque. |
| `if ~isempty(this_obj.ActiveComponent)` | |
| `  lines.pushBack(sprintf('Active component: %d', ...`<br>`    this_obj.ActiveComponent));` | This object has an ActiveComponent, so include information about it in the generated HTML. |
| `end` | |
| `lines.pushBack('<ol>');` | Start an ordered list by pushing the <ol> tag onto the end of the deque. |
| `for k = 1:numel(this_obj.Sequence)` | |
| `  lines.pushBack('<li>');` | Start a list item by pushing the <li> tag onto the end of the deque. |
| `  lines.pushBack(this_obj.Sequence{k}.toHtml(level + 1));` | Include the HTML description of the k-th object in the sequence as the list item text. |
| `  lines.pushBack('</li>');` | End the list item. |
| `end` | |
| `lines.pushBack('</ol>');` | End the ordered list. |
| `str = sprintf('%s\n', lines.items{:});` | Convert all the HTML lines currently contained in the deque into a single text string that can be written to a file. |

| | |
|---|---|
| ▦ ▦ Breadcrumb | |
| *PackageName* | Formal Interface |
| *ClassName* Class (or Abstract Class) | *ReleaseNumber* |
| Class purpose | |

Class Hierarchy
    *RootClassName*
        *SubclassName*
            *CurrentClassName*

Mix-In Classes
    *ClassLink1, ClassLink2*

Description
    This class provides ...
    To implement this class, you must ...

> Class Attributes
    > Copy Behavior
    > Default Indexing Behavior
    > Default Concatenation Behavior
    > Subclassing

Constructor
    > Syntax
    > Description
    > Examples
    > Input Arguments

Properties
    > *PropertyName1*
    > *PropertyName2*
    Properties inherited from *PackageName.ClassName*
    *InheritedPropertyLink1, InheritedPropertyLink2*

Methods
    > *MethodName1*
    > *MethodName2*
    > *MethodName3*
    > *MethodName4*
    Methods inherited from *PackageName.ClassName*
    *InheritedMethodLink1, InheritedMethodLink2*

Events

Revision History

Related Links

> Breadcrumb
>
> *functionName*                                                      *ReleaseNumber*
>
> Function purpose
>
> Syntax
>   *OutputArgument1 = functionName(InputArgument1,InputArgument2,Name,Value)*
>
> Description
>   Description of what the function returns for each syntax, with links to corresponding input arguments, output arguments, and examples
>
> Examples
>   > *Example1*
>   > *Example2*
>   > *Example3*
>
> Input Arguments
>   > *InputArgument1*
>     *value summary*
>   > *InputArgument2*
>     *value summary*
>
>   Name-Value Pair Arguments
>   > *Name,Value1*
>     *value summary*
>   > *Name,Value2*
>     *value summary*
>
> Output Arguments
>   > *OutputArgument1 (may be an object linked to the corresponding "object" page)*
>
> Revision History
>
> Related Links

FIG. 11G

DUAL PROGRAMMING INTERFACE

RELATED APPLICATION

This application claims priority to provisional patent application Ser. No. 61/494,254 filed Jun. 7, 2011 the contents of which are herein incorporated by reference.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 8 illustrates exemplary interface elements and characteristics for interface elements for use with an informal interface and a formal interface;

FIG. 11B illustrates an exemplary user input received via a formal interface in an exemplary embodiment;

FIGS. 11C and D illustrate exemplary user interfaces showing code for use with a formal interface and comments related to the code;

FIG. 11E illustrates an exemplary documentation template for use with a formal interface;

FIG. 11G illustrates an exemplary documentation template for use with an ordinary function for use with an informal interface.

DETAILED DESCRIPTION

Figure 1:
FIG. 1 illustrates an exemplary skills matrix for users of an embodiment of the invention.

The following detailed description refers to the accompanying drawings. The same reference numbers in different drawings may identify the same or similar elements.

A computing application may include user interfaces that are understood and used by non-professional programmer users (NPPs). However, as the computing application evolves over time and becomes larger, more complex, and/or more capable, users may find that interfaces become more complex, intimidating, and/or confusing to use.

For example, professional programmers, such as application developers, may use object oriented languages and programming techniques to develop functionality for users that are not experienced programmers, such as students, engineers, scientists, business analysts, etc. The NPPs are unfamiliar with syntaxes, notations, and/or semantics used by developers, such as dot-notations for representing classes, methods, constructors, etc. Developers may also prefer the use of explicit names for routines, variables, etc., that may require lengthy names that can be difficult for users to remember or type without error. Developers may be familiar and comfortable with, and may prefer using professional programmer-like syntaxes and notations when writing code for implementing the application. As a result, these developers may tend to use similar notations and syntaxes for implementing user functionalities in the application. This tendency may become more prevalent as the computing application becomes larger and more complex over time.

Developers may further design user interfaces to the application such that the user interfaces require all users to use experienced programmer-like syntaxes and/or notations to interact with the application. This design and implementation approach may cause users to become overwhelmed, intimidated, confused, and/or frustrated when working in the application because these users are forced to work with interfaces that are difficult to understand without a programming background or extensive experience using object-based applications and/or interfaces.

For example, most, if not all, NPPs may be unfamiliar with using dot notations for expressing and accessing application functionality (e.g., matlab.base.RandomNumberStream.setGlobalStream(s) to specify a stream for a random number generator). In addition, NPPs may find it tedious to use long and explicit names for routines and/or parameters that may be used with programmer-like nomenclatures. Moreover, NPPs may discover that they are prone to committing typographical errors when entering routine names requiring numerous key strokes.

As used herein, developer can refer to a person whose job is developing reusable software, such as reusable application code. Developers may be professional programmers comfortable working with computer-science-like syntaxes, constructs and/or nomenclatures, such as object-based syntaxes, etc. NPP may refer to a person that is a user of an application and that is not a professional programmer or developer, and can include, for example, newcomers (i.e., people just beginning to use the application), intermediate users (e.g., users that are content with a moderate level of application familiarity), power users (e.g., users that perform complex operations using the application but that do not develop reusable software applications), etc. The term user generally refers to a person that interacts with embodiments of the invention and can be an NPP or a developer unless otherwise noted.

One or more embodiments of the invention may categorize users into user segments or groups based on their respective skill sets. For example, an embodiment can classify users as NPPs or developers based on their respective skill sets. Other embodiments may classify users into more groups, and/or into groups having different labels and/or characteristics than those discussed herein.

Exemplary embodiments disclosed herein employ a dual interface design for providing computing application functionality to users according to the knowledge of a respective user. For example, an embodiment may provide NPPs with an informal user interface that allows the NPP to access application functionality using simple routine names and a limited number of input arguments. The routine names and input arguments may not require knowledge of programmer-like syntaxes, constructs, nomenclatures, etc. The informal interface may tolerate some ambiguity with respect to, for example, routine names for the sake of convenience (e.g., short names, easy to remember names, etc.). By way of example, an informal interface may allow the use of hist(x) for computing a histogram of x. Using hist is shorthand for histogram but has some ambiguity because it could be shorthand for history.

The embodiment may further provide a highly experienced user, such as a developer, with a formal interface that uses dot-notations and explicit highly-qualified naming conventions that can include numerous characters. The formal interface may remove potential ambiguities associated with the informal interface through the use of explicit naming conventions.

The embodiment may further provide regions of overlap between the functionalities of the informal interface and the formal interface to allow aspects of the informal interface to make use of capabilities available via the formal interface. For example, methods and properties that can be used via the formal interface, using for example, dot notation and/or explicit names. These methods and/or properties can be provided to the informal interface as, for example, ordinary routines. In an embodiment, a wrapper may be used to shield aspects of the functionality that are compatible with the formal interface when the functionality is provided to the informal interface as an ordinary routine.

For example, NPPs of the application that do not have formal programming backgrounds may use aspects of the informal interface to allow them to access functionality that may be more closely associated with capabilities of the formal interface without requiring that these users be familiar with programmer-like syntaxes used with the formal interface. For example, an embodiment may allow an NPP to enter a short routine name, e.g., plotgui, to open a plotting graphical user interface (GUI). The plotgui routine may include point-and-click buttons in the opened plot window to provide the user with functionality for manipulating characteristics of the plot window. Absent the point-and-click buttons, this additional functionality may only be accessible to the user via a formal interface that uses, for example, a programmer-like syntax (e.g., dot notation).

The embodiment may be configured to identify typical tasks performed by the application and may further associate those tasks with some or all of the user groups. Alternatively, or additionally, the embodiment may associate the tasks with demographic information for the user groups, typical opinions held by the user groups with respect to the application, programming skill levels for the user groups, educational backgrounds for the user groups, etc.

The following description of exemplary embodiments of the invention may make use of terms such as routine, class routine, global routine, ordinary routine, package routine, package, class definition, and constructor method. A routine (also a command, routine, subroutine, method and/or procedure) may refer to a portion of source code within a larger computer program that performs a specific task and is relatively independent of the remaining code. The routine can be started (called) one or more times and may be called from several places during one execution of the larger program. The routine may be called from other routines. The routine can be called and can branch back (return) to a next instruction in a program after being called and once the routine's computing task is finished. Routines can be grouped into collections, such as libraries if desired. Routines may include input arguments and output arguments and may have a local scope.

Class routine may refer to a routine defined by a classdef file. A class routine can be a constructor method, an instance method, or a static method. Global routine may refer to a routine that does not reside in a package. Ordinary routine may refer to a routine that is not object-based. Ordinary routine may refer to a routine that is not a class routine, i.e., not defined in a classdef file. Package routine may refer to a routine that is part of a package. Package may refer to a namespace that organizes a set of related classes and interfaces. The package may be a collection of routines that are grouped together with a leading name (the package name) with a dot often separating the individual routine name from the package name.

Method may refer to a routine associated with a class. The method can define the behavior exhibited by an instance of the associated class at program runtime. For example, at runtime, the method may have access to data stored in an instance of the class. Instance method may refer to a method defined in a class which is accessible through the object of the class. Static method may define a method that does not require an instance of the class. Constructor method may refer to a class method that can be called at the beginning of an objects lifetime and may be used to initialize the object. Initialization of an object may include acquisition of resources. A class definition may be used to define a class.

FIG. 1 illustrates an exemplary skills matrix 100 for categories of users that can interact with an embodiment of the invention. Matrix 100 may include rows identifying user types and columns identifying characteristics of the user types. For example, user types may include an NPP and a developer. For purposes of discussion herein, the application having an informal interface and a formal interface is assumed to be a technical computing application (also known as a technical computing environment (TCE)). Embodiments of the invention are not limited to technical computing applications and can be used with other applications that can benefit from having an informal interface and a formal interface consistent with principles of the invention.

An NPP may include users having a range of skills with respect to the technical computing application. NPPs may find programmer-like interfaces intimidating, may have rudimentary application programming skill, low or non-existent professional software developer skill, and/or may not have a programming style. An NPP may also include someone that is familiar with using basic functionality of the application but that has not progressed beyond basic interactions with the application. An NPP in this segment may use the application to perform technical computing tasks, such as plotting a function, and may view the application as an advanced, or sophisticated, calculator for making numerical calculations. An NPP may further have low application programming skills and low or non-existent professional software development skills. NPPs in this segment may use an imperative programming style that includes the use of scripts for repeating, for example, repetitive calculations.

An NPP may further include someone having experience with the application and that uses the application for complex processing and/or display tasks. An NPP in this segment may use the application to perform technical computing tasks and may include engineers, scientists, analysts, etc. This user segment may view the application as an acceptable programming language for users of similar skill levels and may have moderate or high levels of application programming skill, e.g., an NPP in this segment may be self-taught with respect to basic programming skills or may have taken a programming course. An NPP in this segment may have no to low software development skill and may use a procedural programming style that, for example, creates ordinary routines. An NPP may use pre-existing object definitions and interact with them through an informal interface that treats the pre-existing object definitions like ordinary routines and that does not employ developer object-oriented syntax.

Developer may identify a user whose main focus is developing professional software using the application. For example, a developer may write code for toolboxes, libraries, and/or deployable programs using the application. A developer may include a software developer and/or a professional software programmer. The developer may view an application (e.g., a TCE) as one more programming language they use, but one well suited for performing math and engineering computations. The developer may use object oriented programming syntax and semantics (e.g., classes), and may define their own classes, when developing software using the application. Such developer syntax and semantics can include using packages with their corresponding dot notation to avoid namespace collisions, using static methods and their corresponding dot syntax to access class routines, use of dot syntax to access instance methods, and the use of long names for clarity in large applications. Developer functionality can include using semantics and syntax, often object oriented, that are not familiar to NPPs, who may be familiar with only procedural and imperative programming techniques. Such functionality includes package encapsulation, static methods, subclassing, and class management.

Other developer functionality may include, but is not limited to, routines for writing robust applications, including advanced error handling, exception handling, and routines for internationalization features, application programming interfaces for providing control of individual applications (e.g., Excel, Simulink, MATLAB add on graphical user interface programs, etc.), internal underlying implementations that may demand the use of object oriented and developer specific semantics functionality because of their architecture or scale, routines used for defining new classes including, but not limited to, subclassing, inheritance, and mixins; interoperability with other object oriented languages, (e.g., Java, C++, .NET, etc.), and less used features that possibly would only be used for building large, and/or complex, and/or object-oriented applications.

Based on user types, an embodiment may group knowledge and operations typically performed using the application. If desired, the embodiment may further associate or group the operations according to criteria such as managing code, data types, syntax, etc. The embodiment may further associate the operations and criteria with various user groups if desired.

Figure 2:
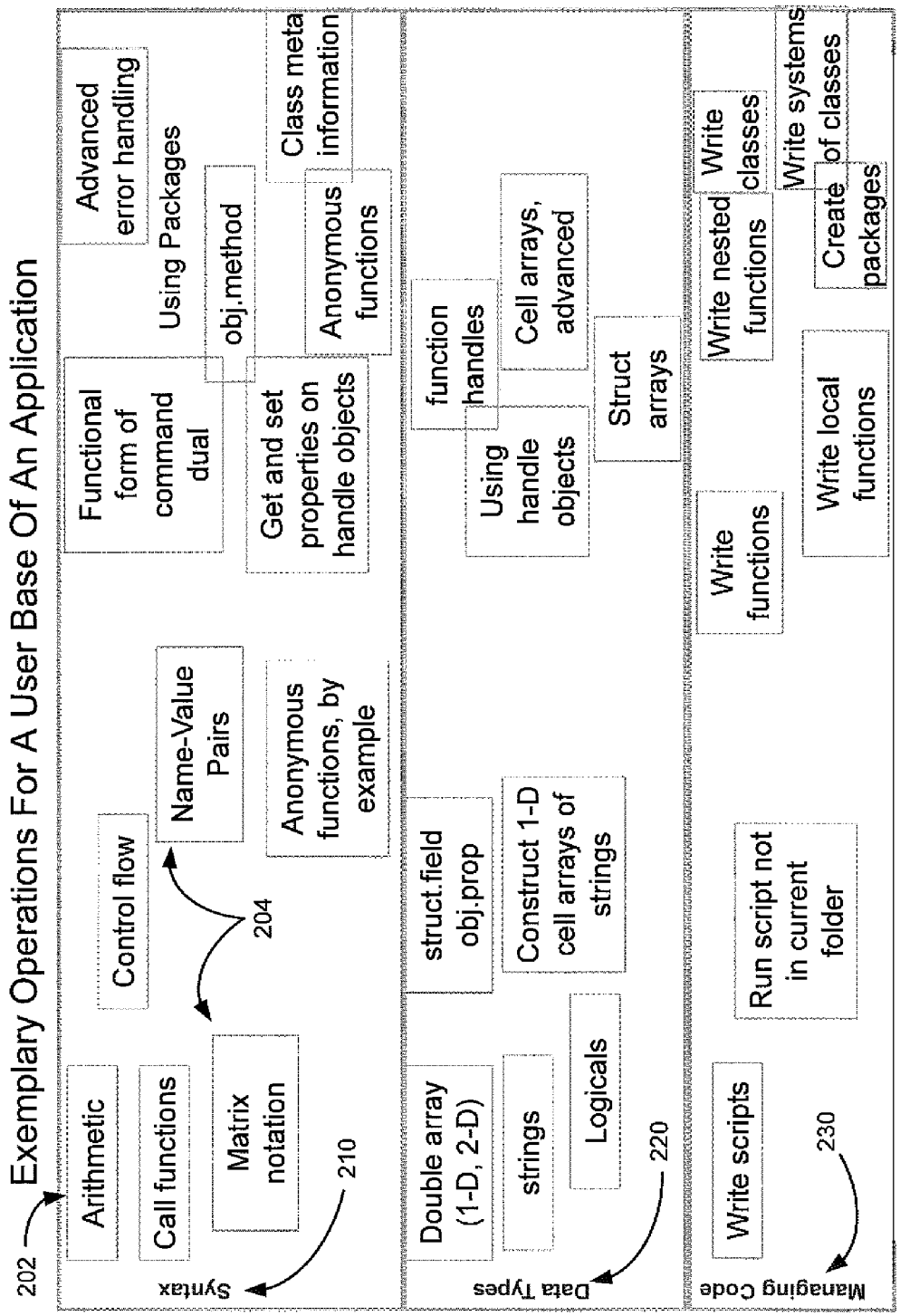
FIG. 2 illustrates exemplary operations that can be performed by members of a user base using an embodiment of the invention.

FIG. 2 illustrates exemplary operations that can be performed using an embodiment of the invention. The embodiment may include identifiers for a number of operations 202 and/or items 204, such as but not limited to, calling routines, name-value pairs, strings, function handles, etc. The operations and items may be grouped according to, for example, syntax 210, data types 220, managing code 230, etc.

Syntax 210 may refer to the set of rules that define combinations of symbols that are considered to be correctly structured programs or program elements in the application. In cases where the application is a programming language, syntax 210 can define combinations of symbols that make up a correctly structured program in the programming language. The syntax 210 of a text-based programming language may be based on sequences of characters, and the syntax 210 of a visual programming language may be based on the spatial layout and/or connections between symbols, such as graphical elements in an executable block diagram.

Data types 220 may refer to a classification identifying types of data that determines possible values for that type, operations that can be done on values of that type, the meaning of the data, and the way values of that type can be stored. Examples of types of data are, but are not limited to fixed-point, floating-point, integer, Boolean, and classes.

Managing code 230 may refer to techniques for organizing and maintaining code associated with an application. For example, scripts can be used to group lines of code, that when executed, perform certain operations. Code can further be arranged in packages if desired.

In an embodiment, operations 202 and items 204 (illustrated in FIG. 2) can be arranged according to syntax 210, data types 220 and/or managing code 230. Operations 202 and items 204 may become more complex as one moves from the left side of FIG. 2 to the right side of FIG. 2. (e.g., developers may represent a certain percentage of users for an application and may be associated with operations 202 and items 204 proximate to the right side of FIG. 2).

Relating user types from FIG. 1 to the operations 202 and items 204 of FIG. 2 allows an embodiment to associate operations/items used with an informal interface and operations/items used with a formal interface.

Figure 3:
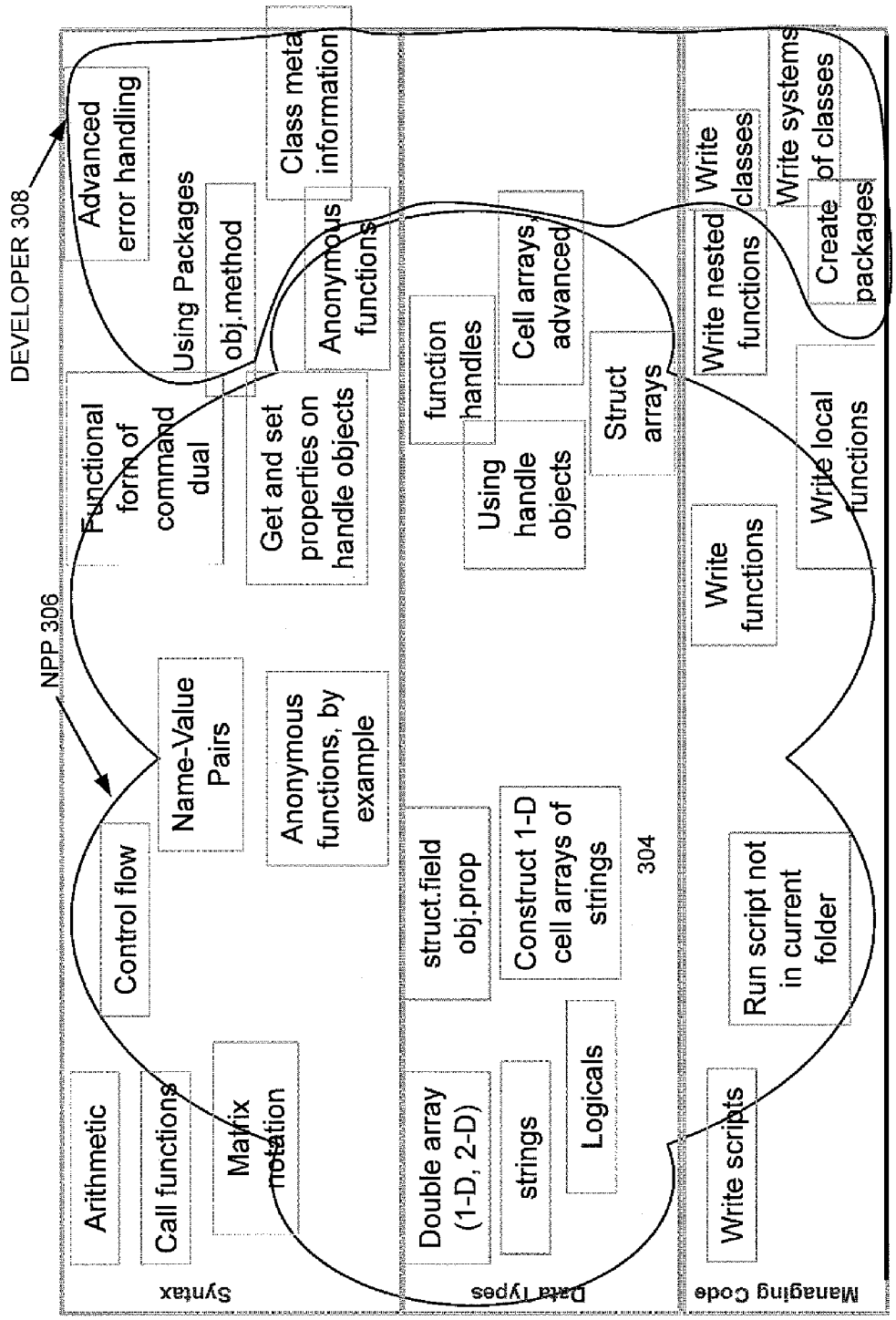
FIG. 3 illustrates exemplary user categories that can be associated with operations of FIG. 2.

FIG. 3 superimposes exemplary user categories from FIG. 1 on the operations and items of FIG. 2. The depiction of FIG. 3 is illustrative and other implementations can include additional or fewer user types, additional or fewer operations/items, other types of operations/items, etc., without departing from the spirit of the invention. Moreover, boundaries of FIG. 3 may vary in terms of overlapping regions and/or non-overlapping regions.

An exemplary embodiment or an application developer writing code for the application can use information from FIG. 3 to employ, encourage, identify and/or enforce what types of functionality should be provided to application users in different user segments using an informal interface and what types of functionality should be provided via a formal interface. Once a baseline design for an informal interface and a formal interface is determined, subsequent enhancements to an application can be evaluated using techniques similar to those described above to determine how enhancements should be provided to users via informal and formal interfaces. These techniques allow applications to increase in size, complexity, capability, etc., without forcing certain user segments (e.g., NPPs) to interact with complicated, programmer-like syntaxes and/or interfaces.

Figure 4:
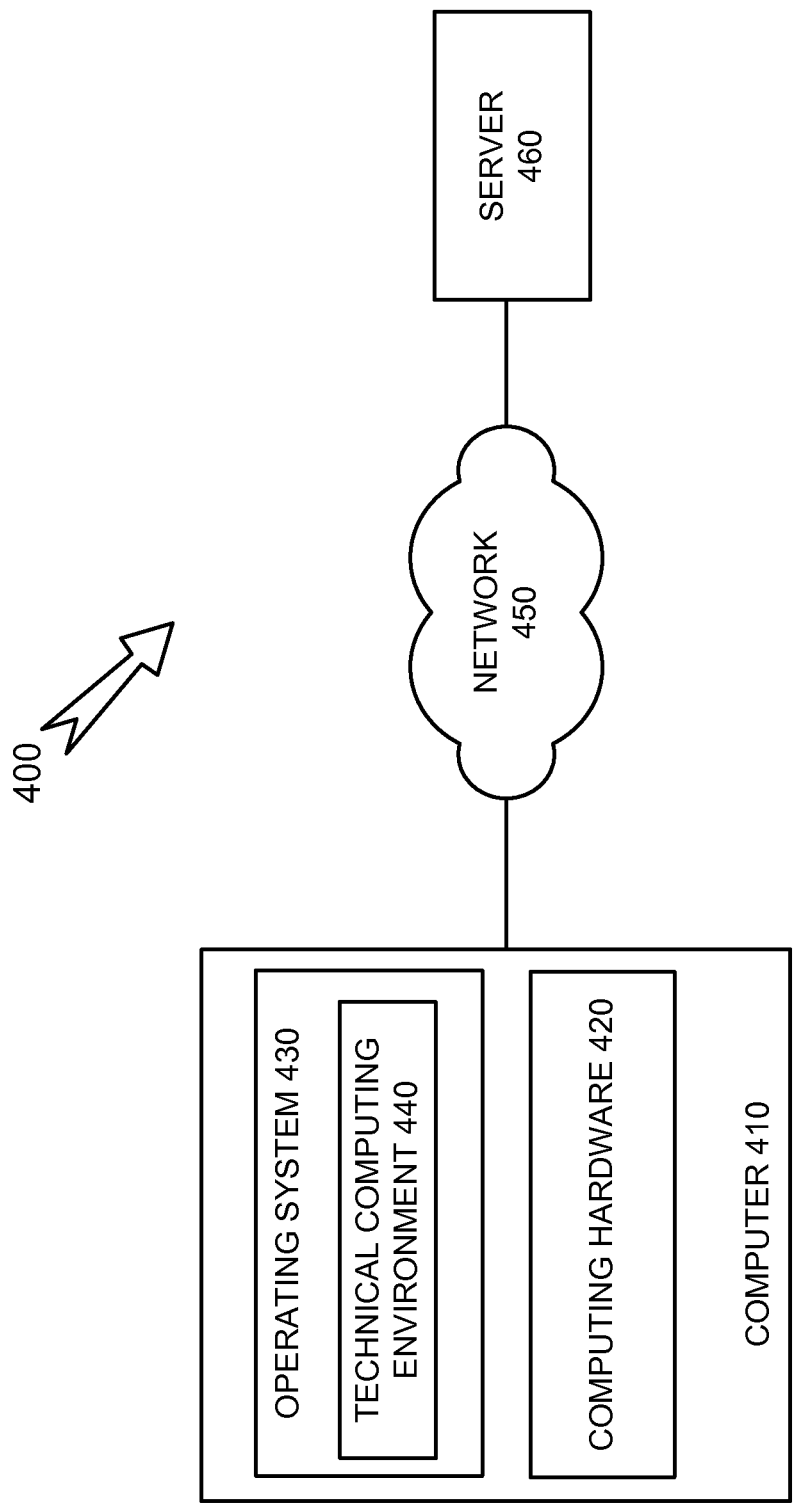
FIG. 4 illustrates an exemplary system that can be used for practicing an embodiment of the invention.

FIG. 4 illustrates an exemplary system that can be used for practicing one or more embodiments of the invention. System 400 may include computer 410, computing hardware 420, operating system 430, network 450, and server 460. The embodiment illustrated in FIG. 4 is illustrative and other implementations of system 400 can include additional devices, fewer devices, or the devices of FIG. 4 configured in ways not shown in FIG. 4. Computer 410 may include a device that performs processing operations, display operations, communication operations, etc. For example, computer 410 may include logic, such as one or more processing or storage devices, that can be used to perform and/or support processing activities on behalf of a user. Embodiments of computer 410 may include a desktop computer, a laptop computer, a client, a server, a personal digital assistant (PDA), a web-enabled cellular telephone, a smart phone, smart sensor/actuator, or another computation or communication device that executes instructions to perform one or more activities and/or to generate one or more results.

Computer 410 may further perform communication operations by sending data to or receiving data from another device, such as server 460. Data may refer to any type of machine-readable information having substantially any format that may be adapted for use in one or more networks and/or with one or more devices. Data may include digital information or analog information. Data may further be packetized and/or non-packetized. Server may refer to a computing cloud.

Figure 5:
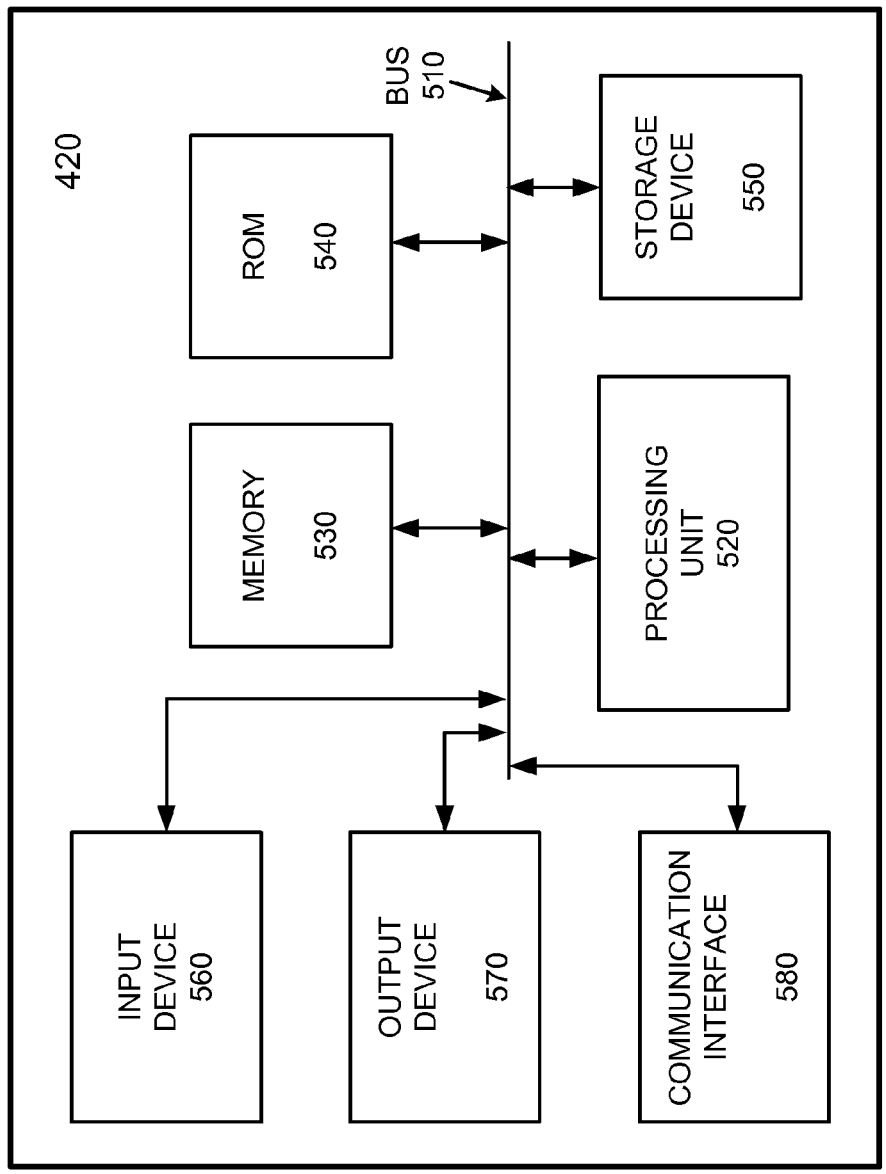
FIG. 5 illustrates an exemplary computing architecture that can be used for implementing the computer or server of FIG. 4.

Computing hardware 420 may include logic for performing computations on computer 410 and may include the components illustrated in FIG. 5 in an exemplary implementation.

Referring now to FIG. 5, computing hardware 420 may include a bus 510, a processing unit 520, a main memory 530, a read-only memory (ROM) 540, a storage device 550, an input device 560, an output device 570, and/or a communication interface 580. Bus 510 may include a path that permits communication among the components of device 500. Computing hardware 420 may reside in other devices, such as server 460, network hardware, embedded devices, etc.

Processing unit 520 may include a processor, multiple processors, microprocessors, or other types of processing logic that may interpret, execute, and/or otherwise process information contained in, for example, storage device 550 and/or memory 530. The information may include computer-executable instructions and/or data that may implement one or more embodiments of the invention. Processing unit 520 may comprise a variety of hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. Processing unit 520 may comprise a single core or multiple cores. Moreover, processing unit 520 may comprise a system-on-chip (SoC), system-in-package (SiP), etc.

Main memory 530 may include a random access memory (RAM) or another type of dynamic storage device that may store information and instructions for execution by processing unit 520 (e.g., instructions implementing TCE 440). ROM 540 may include a ROM device or another type of static storage device that may store static information and/or instructions for use by processing unit 520. Storage device 550 may include a magnetic and/or optical recording medium and its corresponding drive. In some implementations, main memory 530 or storage device 550 may also be implemented as solid state memory, such as flash-based memory.

Input device 560 may include a mechanism that permits an operator to input information to device 500, such as a keyboard, a mouse, a pen, a single or multi-point touch interface, an accelerometer, a gyroscope, a microphone, voice recognition and/or biometric mechanisms, etc. Output device 570 may include a mechanism that outputs information to the operator, including a display, a printer, a speaker, etc. In the case of a display, the display may be a touch screen display that acts as both an input and an output device.

Communication interface 580 may include any transceiver-like mechanism that enables device 500 to communicate with other devices and/or systems. For example, communication interface 580 may include mechanisms for communicating with another device or system via a network, e.g., a network interface card.

Computer 410 may perform certain operations in response to processing unit 520 executing software instructions contained in a computer-readable medium, such as main memory 530. For instance, computer 410 may implement a technical computing application by executing software instructions from main memory 530. A computer-readable medium may be defined as a non-transitory memory device, where the memory device may include a number of physically, possibly distributed memory devices. The software instructions may be read into main memory 530 from another computer-readable medium, such as storage device 550, or from another device via communication interface 580. The software instructions contained in main memory 530 may cause processing unit 520 to perform processes that will be described later. Alternatively, hardwired circuitry may be used in place of or in combination with software instructions to implement processes described herein. Thus, implementations described herein are not limited to any specific combination of hardware circuitry and software.

Although FIG. 5 shows example components of computer 410, in other implementations, device 500 may contain fewer components, different components, differently arranged components, or additional components than depicted in FIG. 5. Alternatively, or additionally, one or more components of computer 410 may perform one or more tasks described as being performed by one or more other components of computer 410.

Returning now to FIG. 4, operating system 430 may manage hardware and/or software resources associated with computer 410. For example, operating system 430 may manage tasks associated with receiving user inputs, operating computing environment 440, allocating memory, prioritizing system requests, etc. In an embodiment, operating system 430 may be a virtual operating system. Embodiments of operating system 430 may include Linux, Mac OS, Microsoft Windows, Solaris, UNIX, etc. Operating system 430 may further run on a virtual machine, which can be provided by computer 410 and/or server 460. In an embodiment, operating system 430 can include or may interact with, a technical computing environment (TCE) 440.

TCE 440 may provide a computing environment that may allow, for example, a user to perform tasks related to disciplines, such as, but not limited to, mathematics, science, engineering, medicine, business, biology, finance, etc. TCE 440 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations.

TCE 440 may include a programming language (e.g., the MATLAB language) that may be used to express problems and/or solutions in mathematical notations. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

A='hello'
A=int32([1, 2])
A=[1.1, 2.2, 3.3]

Now suppose the program is executed, for example, in a TCE, such as TCE 440. During run-time, when the statement "A='hello'" is executed the data type of variable "A" may be a string data type. Later when the statement "A=int32([1, 2])" is executed the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

TCE 440 performs matrix and/or vector computations that may be used for data analysis, data visualization, application development, simulation, modeling, and/or algorithm development. These matrix and/or vector formulations may be used in many areas, such as, but not limited to, statistics, image processing, signal processing, control design, life sciences modeling, financial modeling, discrete event analysis and/or design, and state-based analysis and/or design.

TCE 440 provides mathematical routines and a high-level programming language suitable for non-professional programmers and may provide graphical tools that may be used for creating plots, surfaces, images, volumetric representations, or other representations. TCE 440 may provide these routines and/or tools using toolboxes (e.g., toolboxes for signal processing, image processing, data plotting, parallel processing, etc.). TCE 440 may also provide these routines in other ways, such as, for example, via a library, local or remote database (e.g., a database operating in a computing cloud), remote procedure calls (RPCs), and/or an application programming interface (API). Embodiments of TCE 440 may be configured to improve runtime performance when performing computing operations. For example, TCE 440 may include a just-in-time (JIT) compiler in an exemplary embodiment.

Figure 6:
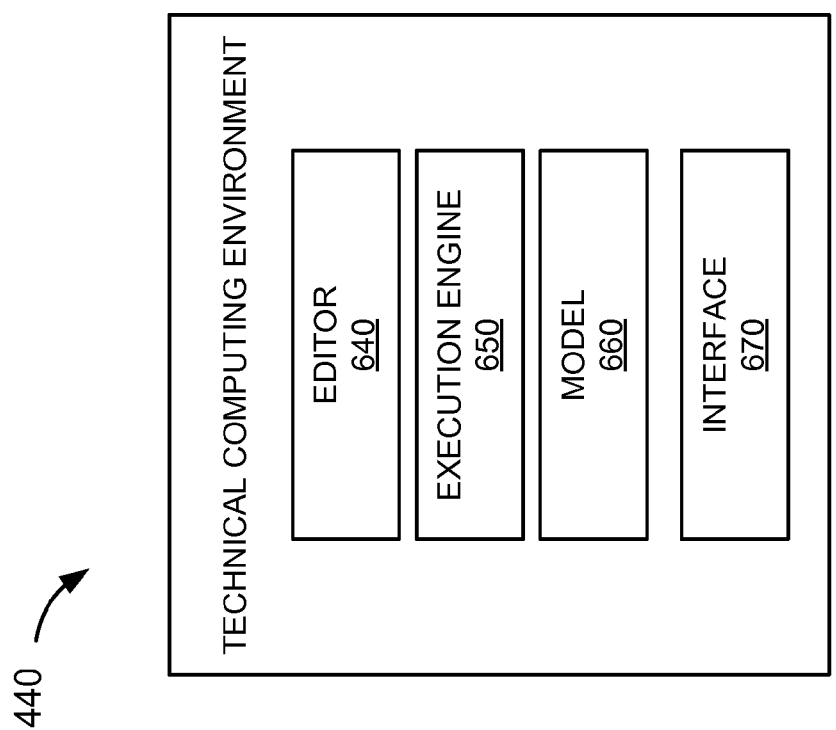
FIG. 6 illustrates an exemplary functional diagram of the computing environment of FIG. 4.

Referring now to FIG. 6, TCE 440 may comprise various components, which may include an editor 640, an execution engine 650, a model 660, and an interface 670. Note that FIG. 6 illustrates an example embodiment of TCE 440. Other embodiments of TCE 440 may contain, for example, more components or fewer components than the components illustrated in FIG. 6. Moreover, in other embodiments of TCE 440, routines performed by the various components contained in TCE 440 may be distributed among the components differently, than described herein.

Examples of TCEs and/or TCE-like applications that may be adapted to implement one or more embodiments of the invention may include, but are not limited to applications that implement languages such as the MATLAB® environment available from The MathWorks, Inc.; GNU Octave from the GNU Project; Mathematica from Wolfram Research, Inc.; Mathcad from Mathsoft Engineering & Education Inc.; Maple from Maplesoft; Scilab from The French Institution for Research in Computer Science and Control (INRIA).

Editor 640 may support receiving instructions from input device 560 on behalf of an NPP or developer (e.g., textual code received from a keyboard). Editor 640 may further support editing code (e.g., source code), requirements, and/or tests that may be generated from or otherwise associated with model 660. In an embodiment, editor 640 may be a block diagram editor that may allow, for example, a user, to specify, edit, annotate, save, publish, and/or print model 660. For example, a block diagram of model 660 may be presented (e.g., displayed) and the editor 640 may contain one or more provisions for specifying, editing, annotating, saving, publishing, and/or printing the block diagram. In another embodiment, editor 640 may provide a user interface that allows a user to make use of scripts that can include first routines compatible with an informal interface and second routines compatible with a formal interface. A script may be a collection of routines that are sequenced and editor 640 may allow first routines and second routines to be used interchangeably within the user interface or script.

Execution engine 650 may use model 660 to simulate some or all of the system represented by model 660. The simulation may include performing various computations, associated with the system, based on information (e.g., geometry information) associated with one or more textual or graphical modeling elements contained in model 660. The computations may include, but are not limited to, computations of dynamics, statics, equilibrium, mass, inertia, collision detection, collision response, and/or force fields associated with the system.

Model 660 may be, for example, a textual-model or a graphical model. For example, model 660 may include, but is not limited to, a time-based graphical block diagram model, a state transition diagram, a discrete event model, an activity diagram, a Unified Modeling Language (UML) diagram, a sequence diagram, and a data flow model. Model 660 may represent a system, such as a physical system. The system represented by model 660 may be dynamic, linear, non-linear, or some other type of system.

Interface 670 may enable, for example, routines, data, code, or other information, to be entered into TCE 440. Interface 670 may allow the information to be entered textually and/or graphically (e.g., via menus). For example, interface 670 may be a command line interface for receiving user input. Interface 670 may also enable the user to input one or more routines and/or code that when executed may cause, for example, a plot to be rendered from, for example one or more data series, and presented on an output device 570.

Embodiments of the invention can include an interface 670 that supports both informal and formal interfaces for receiving commands from users. Interface 670 may be configured to support the use of an informal interface and a formal interface for interacting with NPPs and developers. In an embodiment, interface 670 may interact with editor 640 to allow editor 640 to accept information from a user when the information complies with an informal interface style or a formal interface style. This may allow users of all levels to interact with TCE 440 using a single editor window that may, for example, have a common look and feel for both NPPs and developers.

Returning again to FIG. 4, network 450 may be a communication network that includes digital and/or analog aspects. Information exchanged in network 450 may include machine-readable information having a format that may be used, for example, in network 450, with one or more components in network 450 (e.g., switches, routers, gateways, etc.) and/or with devices coupled to network 450, such as computer 410 and server 460.

For example, network information may be encapsulated in one or more packets that may be used to transfer the information through network 450. Information may be exchanged between components in network 450 using various communication protocols, such as, but not limited to, the Internet Protocol (IP), Asynchronous Transfer Mode (ATM), Synchronous Optical Network (SONET), the User Datagram Protocol (UDP), Transmission Control Protocol (TCP), Institute of Electrical and Electronics Engineers (IEEE) 802.11, or other communication protocol.

Portions of network 450 may be wired (e.g., using wired conductors, optical fibers, wave guides, etc.) and/or wireless (e.g., using free-space optical (FSO), radio frequency (RF), acoustic transmission paths, etc.). Portions of network 450 may include a substantially open public network, such as the Internet. Portions of network 450 may include a more restricted network, such as a private corporate network or virtual private network (VPN). It should be noted that implementations of communication networks and/or devices operating on communication networks described herein are not limited with regards to, for example, information carried by the communication networks, protocols used in the communication networks, and/or the architecture/configuration of the communication networks.

Figure 7:
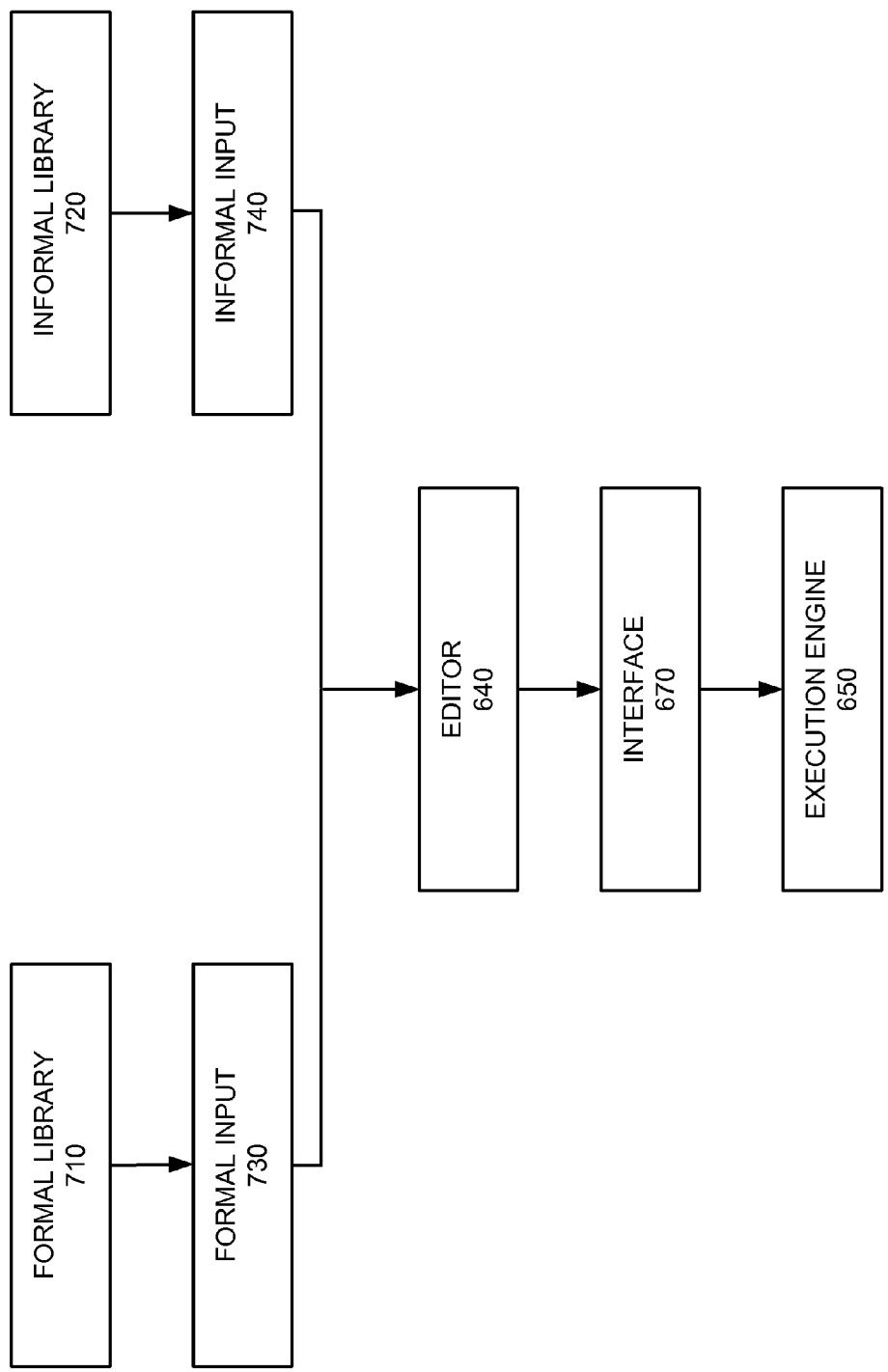
FIG. 7 illustrates an exemplary functional diagram for implementing dual programming interfaces consistent with an embodiment of the invention.

FIG. 7 illustrates an exemplary configuration for implementing aspects of the invention. FIG. 7 may include a formal library 710, an informal library 720, a formal input 730, an informal input 740, editor 640, execution engine 650, and interface 670. Editor 640, execution engine 650 and interface 670 may operate as described in connection with FIG. 6. Formal library 710 may include a data store that includes information for use with a formal interface. For example, formal library 710 may include, but is not limited to, routines, commands, package names, classes, instance methods, static methods, constructors, etc., for use in implementing features of a computing environment, such as but not limited to TCE 440, for use in defining or implementing a formal interface.

In an embodiment, formal library 710 may store information for programming tasks where a deliverable of the task may be code for use by others. For example, code produced from a programming task may be intended to be maintained over a period of time, deployed to remote users or applications, etc. In an embodiment, information stored in formal library 710 may make use of unabbreviated routine and method names that are fully spelled out and unambiguous with respect to an operation that a formal library item performs. The embodiment may also use camelCase long names for naming instance methods and static methods and Mixed-Case naming for constructors and class definitions. In an embodiment, information stored in formal library 710 may live in packages and be accessed by developers using package notation.

Informal library 720 may include a data store that includes information for use with an informal interface. For example, informal library 720 may store routines and methods intended to be used by NPPs. Information stored in informal library 720 may be intended for use interactively or for scripting, and/or intended for use in repetitive tasks. Information stored in informal library 720 may make use of short names that are intended to be easily typed and/or remembered by users having limited experience with TCE 440. For example, an embodiment of informal library 720 and/or an informal interface may make use of a lowercase short convention, where lowercase short may indicate that names should be in lowercase letters and that short names should include either a single short word or a multiword phrase that may be condensed using abbreviations and/or acronyms. In an embodiment, information stored in informal library 720 may exist in a global namespace and not in packages.

Formal input 730 may represent a portion of the information stored in formal library 710. For example, an item, such as a construct represented using dot notation, may be retrieved from formal library 710 and associated with data values or variables. The construct and data/variables may make up a formal input that is entered into editor 640, e.g., by a developer, as part of a reusable code module. Interface 670 may evaluate formal input 730 to ensure that the input complies with a formal interface type. Interface 670 may pass the construct and data/variables to execution engine 650 when the input complies with a formal interface type.

Informal input 740 may represent a portion of the information stored in informal library 720. For example, a command, such as hist (shorthand for histogram), may be retrieved and associated with a variable or data to make up informal input 740. Informal input 740 may be provided to editor 640 by, for example, a user that is an NPP. Interface 670 may evaluate informal input 740 to determine if the input complies with an informal interface type. Interface 670 may pass informal input 740 to execution engine 650 when informal input 740 complies with an informal interface type.

An exemplary embodiment may be configured to support a formal interface that can include formal library 710 and formal input 730 and an informal interface that can include informal library 720 and informal input 740. The embodiment may employ and/or enforce certain conventions that apply to the informal and the formal interfaces. For example, a convention may indicate that names contain keywords common to problem domains to which a feature pertains, that names reflect functionality that the feature represents, that names distinguish one type of interface element from another (e.g., distinguish a property from a method), etc.

Additionally or alternatively, the embodiment may also employ, encourage, and/or enforce the use of certain grammatical forms of names to help distinguish types and/or functionalities of features. For example, noun forms, verb forms, adjective forms, etc., may be used in certain situations to help NPPs and developers efficiently use computing devices employing embodiments of the invention. Additionally or alternatively, the embodiment may employ, encourage, and/or enforce different capitalization styles to facilitate visually distinguishing aspects of features for users or to help inform users as to what action a particular feature performs.

FIG. 8 illustrates exemplary interface elements and characteristics for interface elements. For example, table 800 identifies characteristics of interface elements with respect to an informal interface and a formal interface. Information in table 800 may further be associated with, for example, system rules that can pertain to all interface element types regardless of whether the interface elements are associated with an informal interface or a formal interface. Information in table 800, as well as rules discussed above, can be used to ensure naming conventions remain consistent over the life span of an application. Consistent naming rules can further help avoid NPP/developer confusion as new features are added to the application over time. Information in table 800 may be used to employ, encourage, identify and/or enforce naming conventions for executable collections of code, such as routines, that can be used for implementing functionality associated with an informal interface and/or a formal interface.

For example, table 800 may indicate that full names be used for formal interface elements. This may include spelling out all words making up an element name even when multiple words are used. For example, a formal interface may use a routine LoadData while an informal interface may use load. If desired, an embodiment can be configured to allow certain exceptions to the full name requirement of a formal interface, e.g., by allowing abbreviations when the abbreviations are widely known, e.g., HTML in place of hyperTextMarkupLanguage, XML for extensibleMarkupLanguage, etc.

In contrast to the full name requirement of the formal interface, short names or abbreviations may be used for informal interface elements, such as strel for Structuring Element, or rand for random number. Information in table 800 may further identify that abbreviations used with an informal interface element should be lower case and that abbreviations for a formal interface element should be upper case.

If desired, an informal interface may accept full names for some interface elements even though short names may be preferred. For example, a method routine in an informal interface may accept full names having a format of camelCase full. Exceptions may be allowed, such as when an abbreviation is at the beginning of a camelCase name, e.g., the abbreviation may appear as lower case, such as in gpuArray. Rules, if desired, may enforce that abbreviations may be acceptable for informal interface element names but not for formal interface element names.

Information in table 800 may further indicate that full names for some interface elements should be MixedCase or camelCase. MixedCase may involve capitalizing the initial letter of each word in a multiword name (e.g., ImageAdapter, OuterPosition, Map, etc.) and camelCase may involve spelling the first word in a name in lower case and capitalizing the initial letter of subsequent words (e.g., replaceData, disableOutput, run, etc.).

Information in table 800 may further indicate that shortened names should be lowercase (e.g., eig for "eigenvalue", num for "number of", etc.). Still further, information in table 800 may indicate, if desired, that an element having a name comprised of two short words may use camelCase in the formal interface and lower case for the informal interface. Table 800 may include information that makes use of external resources, such as online acronym search engines and acronym finder sites, to determine which acronyms should be considered standards within TCE 440, or they could be determined independently.

Information in table 800 may indicate that the use of abbreviated names that are prone to being misinterpreted by users should be avoided. For example, systemp may be excluded because one user might construe the name to mean "system temperature" while another user may construe the name to mean "system p". Information in table 800 may further indicate that having abutting acronyms in full names, such as full names used with a formal interface is undesirable.

An exemplary embodiment can be configured to enforce a convention where verbs or verb phrases (e.g., close, open, split, etc.) are used for naming things that perform actions (e.g., routines and methods). Naming preferences may further, or alternatively, enforce using lower case names for routines and methods that are part of an informal interface. An embodiment may be configured to account for naming preferences used in earlier versions of a programming environment, such as a legacy version of TCE 440. Accounting for legacy naming preferences may reduce the chances that users are confused by naming conventions used as part of a system having an informal interface and a formal interface. One or more embodiments can include rules or guidelines for implementing particular types of interface elements, such as routines, methods, classes, properties, packages, etc.

Returning to table 800 (FIG. 8), information in table 800 may identify desired naming conventions for interface elements used in a system that supports an informal interface and a formal interface. Table 800 may include a row containing column identifiers for an interface element type, an informal interface and a formal interface. Table 800 is illustrative and other implementations can include additional or fewer rows, columns, interface elements, and/or interface types without departing from the spirit of the invention.

If desired, an embodiment can further specify that certain routines, such as conversion routines (e.g., a routine for converting one coordinate system to another, one color space to another, etc.), may be treated uniquely. For example, an embodiment may allow the digit "2" to be used for some or all conversion routines (e.g., srgb2lab). The embodiment may further apply this rule to conversion routines used in one of the interfaces, such as the informal interface.

Classes may represent things in TCE 440, and an embodiment may specify that classes should be identified using nouns or noun phrases. For example, an embodiment may specify that terms such as Printer, PrintServer, etc., should be used for class names. The embodiment may represent class names using lower case short names in an informal interface. Alternatively, or additionally class names may be represented using camelCase full names in the informal interface. The embodiment may further represent class names using MixedCase full names for use with a formal interface. If desired, there may be restrictions on when MixedCase full names should be used with a formal interface, e.g., only when the class name is associated with a package (e.g., matlab.ui.eventdata.MouseData).

An embodiment may employ a naming convention for classes that do not represent a thing, but instead represent a behavior or capability that, for example, other classes can obtain via inheritance. Such classes may be referred to as mixin classes, and mixin classes may be named using adjectives. The naming convention may further specify that a suffix, such as "able" or "ible" be used to for mixin classes representing behaviors or capabilities. For example, an embodiment of the invention may support mixin class names such as Pickable, Copyable, Resizable, etc. The embodiment may further specify that classes should be placed in packages if desired and that MixedCase full names should be used.

An embodiment may support certain classes that can be used in a global namespace as opposed to in a package. For example, the embodiment may specify that these classes should be used with an informal interface and further that these classes should not be placed in packages. These routines may be offered as convenience routines to causal users via an informal interface. Moreover, names for these classes may follow naming conventions for routines that may also reside in a global namespace.

An embodiment may be configured to handle properties in a consistent manner for use with an informal interface and a formal interface. For example, an embodiment may specify that property names should be represented using MixedCase full names regardless of whether TCE 440 is interacting with information presented via an informal interface or a formal interface. An embodiment can discourage the use of qualifiers identifying the type of container used to store property values. For example, a configuration may avoid the use of property names that end with Array, Object, Matrix, etc. Another configuration may encourage the use of the term method in property names when the property represents, for example, an algorithm choice.

An embodiment may use packages with a formal interface in an exemplary embodiment. For example, packages may be used with code used by developers working in a formal interface. An exemplary embodiment may also specify naming conventions for packages used with a formal interface.

For example, a root package may identify a particular product. The embodiment may be configured to specify that the package name should match the product name to insure that the package is associated with the proper product (e.g., for a product named "Stateflow" the package name would be stateflow). Additionally, the configuration may specify that plural forms of a name should be avoided, that acronyms should be avoided unless the acronym is part of, for example, a trade name, a well understood abbreviation, etc. The configuration may further specify that package names should be, for example, lower case short names. The configuration may further specify that root package names should match root folder names associated with the packages.

An exemplary embodiment may specify how names for subpackages should appear. For example, the embodiment may specify that subpackage names should use lower case short names, avoid the use of plurals, and that subpackage names do not repeat the name of the root package.

Exemplary embodiments can support additional features beyond those illustrated in FIG. 8. For example, embodiments can be configured to specify characteristics for things like events, callbacks, notifications, etc., that can be adapted for use in a system that supports an informal interface and a formal interface for allowing users to interact with, for example, TCE 440.

Figure 9:
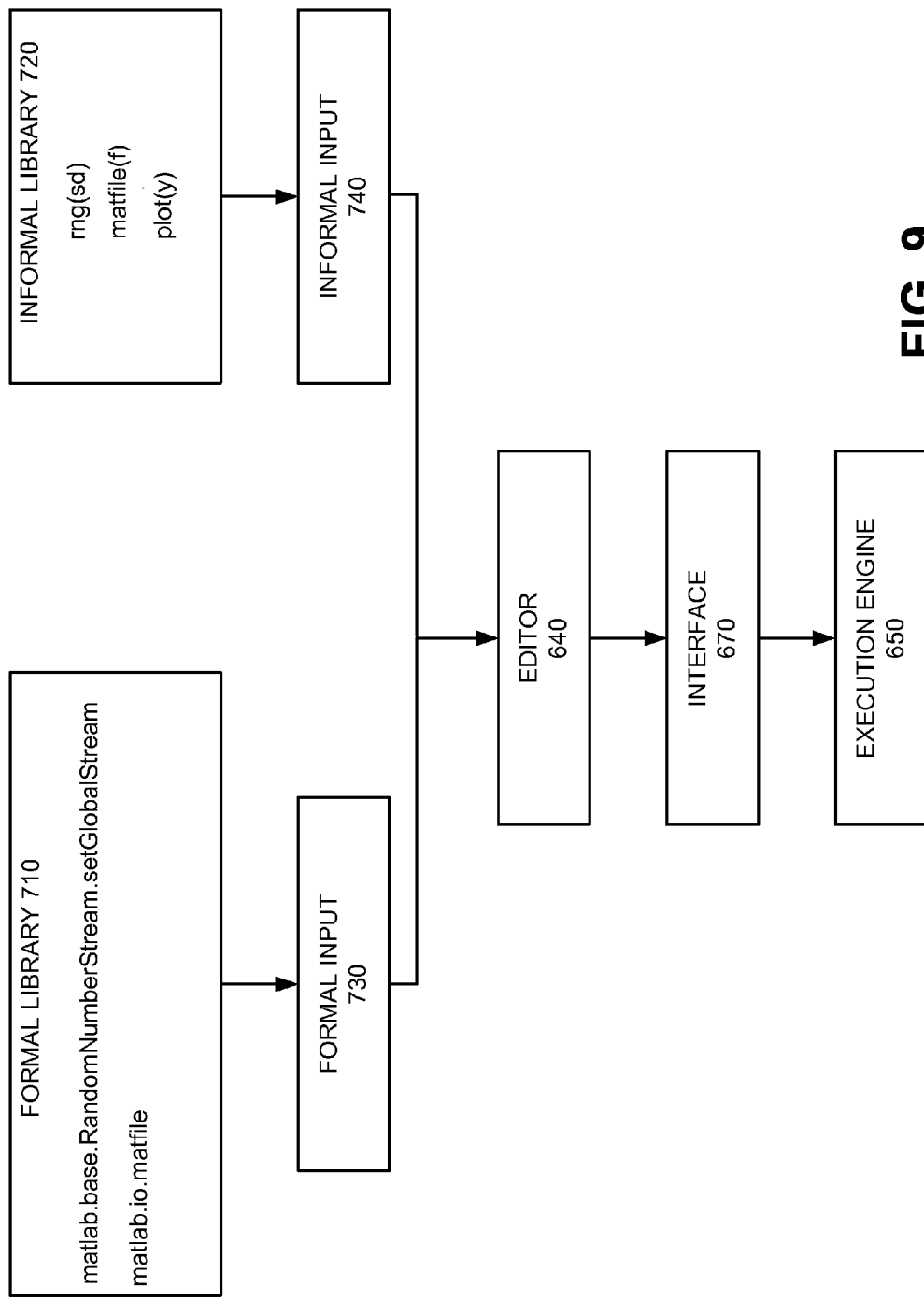
FIG. 9 illustrates an exemplary functional diagram showing information in a formal library and information in an informal library.

FIG. 9 illustrates the configuration of FIG. 7 along with information in formal library 710 and informal library 720. The information in formal library 710 and informal library 720 can comply with naming conventions discussed in connection with table 800. For example, formal library 710 may include a package (e.g. matlab.base), a class (e.g., RandomNumberStream), and a static method class (e.g., setGlobalStream) specified using a dot notation familiar to, for example, professional software developers. matlab.base.RandomNumberStream.setGlobalStream may be used to designate a random number stream for use with a formal interface. In contrast, informal library 720 may include an ordinary routine (e.g., rng(sd)) that seeds a random number generator using, for example, a non-negative integer (sd). The rng(sd) routine may be provided via an informal interface to NPPs to provide these users with an easy to type and easy to remember/understand technique for seeding a random number generator.

Information from formal library 710, complying with a formal interface may make up a formal input 730 to interface 670 for use in TCE 440 and/or another application. Information from informal library 720, complying with an informal interface, may make up an informal input 740 to interface 670 for use by TCE 440 and/or another application.

Figure 10:
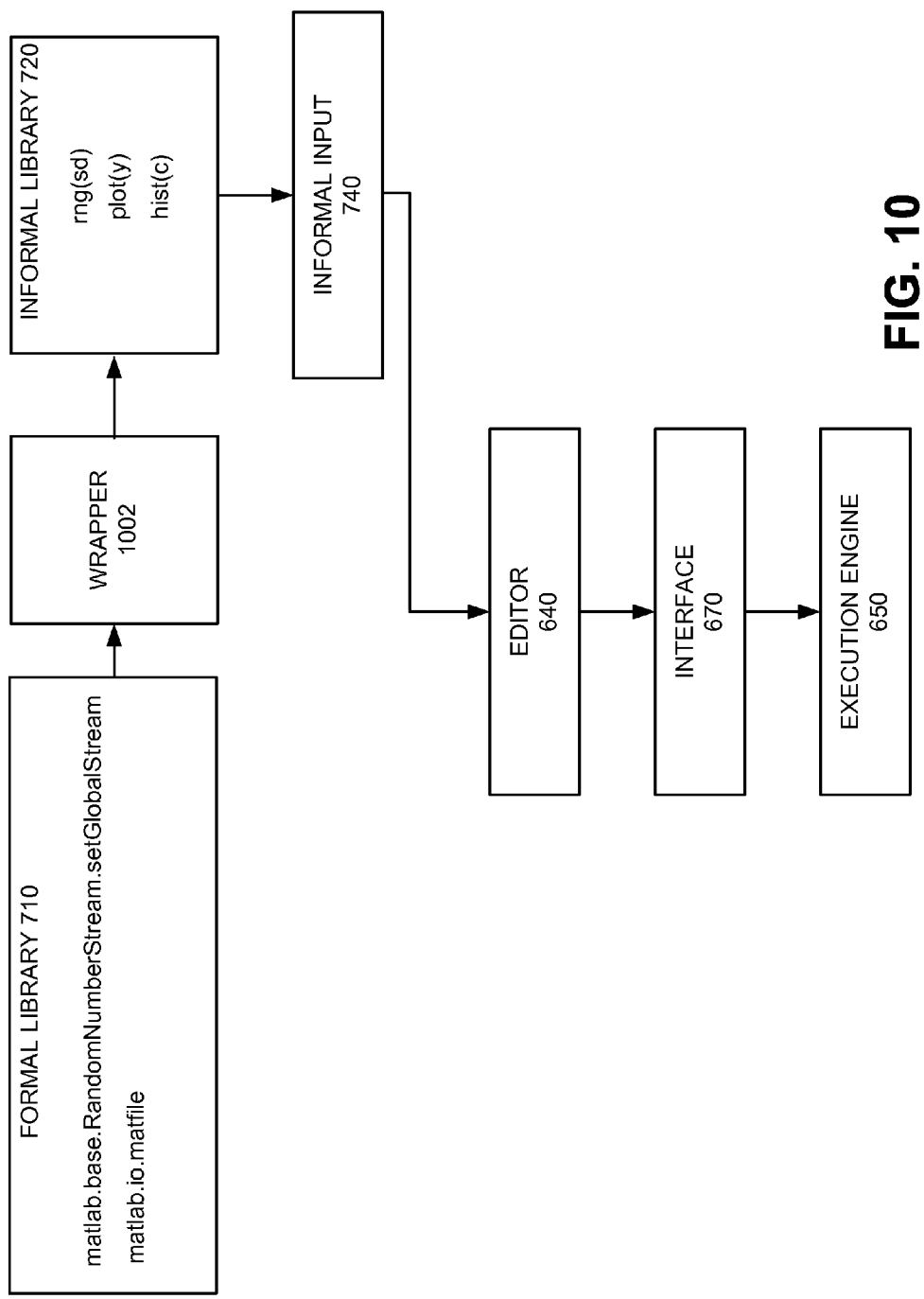
FIG. 10 illustrates an exemplary functional diagram showing the use of a wrapper for use in providing information using an informal interface.

Referring now to FIG. 10, an exemplary embodiment can be configured to use information contained in formal library 710 with informal library 720 and/or informal interfaces of computer 410. For example, the embodiment may use wrapper 1002 to encapsulate aspects of functionality residing in formal library 710. Wrapper 1002 may hide certain features or aspects of formal interface functionality to simplify user interaction with computer 410. For example, Wrapper 1002 allows aspects of formal interface functionality to be provided to an NPP in an easy to understand format using an informal interface.

By way of example, a professional programmer or developer may need to have access to all features of a piece of software functionality, or to implement it in an architecturally robust manner, such as a random number generator. In contrast, NPPs may generally use only a small number of the features or not be familiar with robust class syntax. Embodiments of the invention can account for these differing needs by employing techniques that support encapsulating functionality to provide limited access to commonly used features. Encapsulation may further provide a technique for shortening, simplifying, etc., routine names and formats entered by users interacting with the encapsulated functionality via an informal interface.

For example, referring to FIG. 10, a routine used with an informal interface, such as rng(sd) may make use of features associated with matlab.base.RandomNumberStream.setGlobalStream that may be primarily intended for use with a formal interface. The routine rng(sd) may only require that an NPP specify a non-negative integer, i.e., sd, to make use of the routine in the informal interface. Wrapper 1002 may also allow documentation intended for users of an informal interface to be simplified with respect to documentation intended for use with a formal interface, including using a simplified template, since a limited number of options may be provided to the user of the informal interface as compared to a user (e.g., a developer) making use of similar features using a formal interface.

Figure 11A:
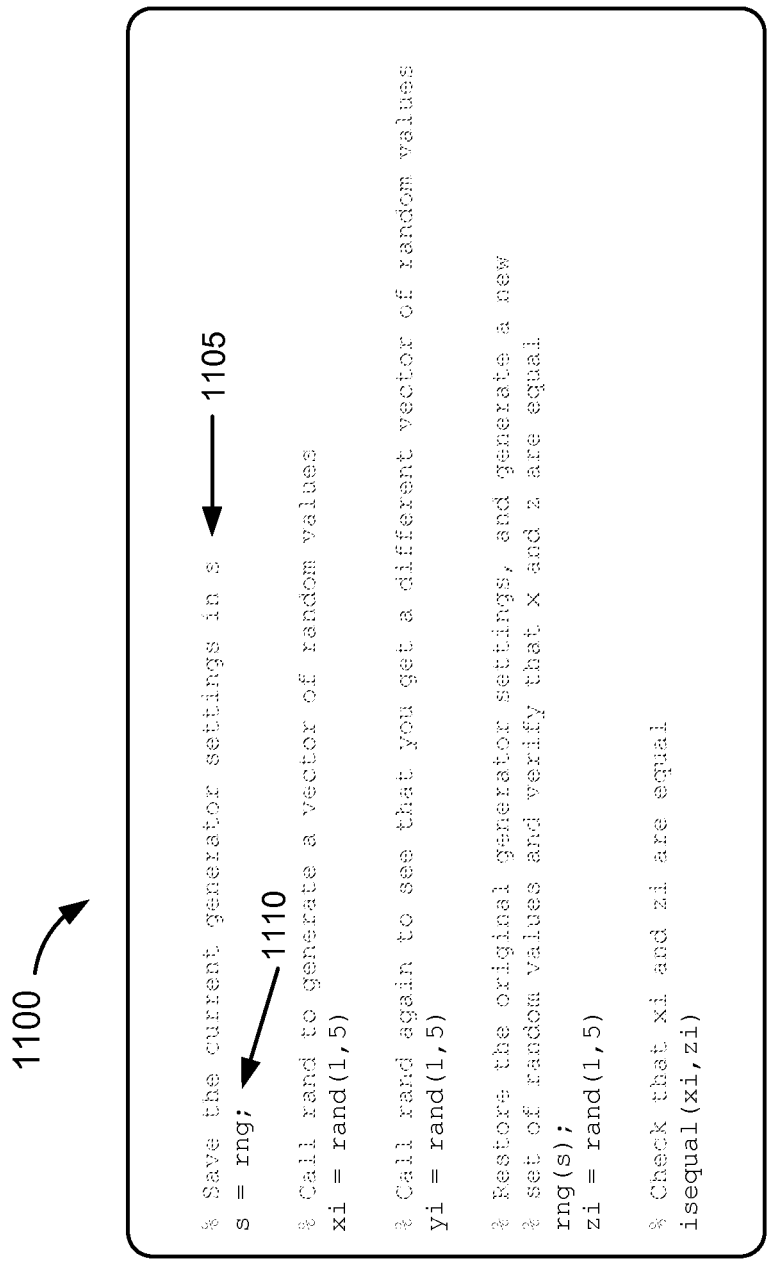
FIG. 11A illustrates an exemplary user input received via in informal interface in an exemplary embodiment.

FIGS. 11A and B illustrate exemplary representations of user inputs, including code, which can be used with an exemplary embodiment that supports an informal interface and a formal interface. FIGS. 11A and 11B illustrate exemplary techniques for creating two equivalent random number arrays using a routine (i.e., mg) compatible with an informal interface (FIG. 11A) and a constructor (i.e., matlab.base.RandomNumberStream) compatible with a formal interface (FIG. 11B).

Referring generally to FIGS. 11A and B, an editor window 1100 can be produced using an editor 640 operating in TCE 440. Window 1100 may provide NPPs and developers with a standardized interface to TCE 440. For example, window 1100 may accept inputs intended for an informal interface and/or a formal interface.

By way of example and referring now to FIG. 11A, an NPP may be interacting with TCE 440 using window 1100 and may enter comments 1105 or instructions 1110 using an informal interface. A first instruction may save a current random number generator setting in a variable s. A second instruction may call a routine named rand to generate a vector of random values. A third instruction may restore an original random number generator setting using a routine named mg. And, a fourth instruction may call rand to generate a second vector of random values.

Referring now to FIG. 11B, window 1100 may receive inputs (e.g., instructions 1115) from, for example, a developer interacting with TCE 440 using a formal interface. For example, a first instruction may create a single random stream and a second instruction may designate the created stream as a current stream. A third instruction may save the state of the current global stream as a variable savedState. A fourth instruction may generate a first vector of random values. A fifth instruction may restore the state of the global stream, and a sixth instruction may generate a second vector of random values.

FIGS. 11C and 11D illustrates exemplary displays of code and comments that can be used with a formal interface. FIG. 11C illustrates display 1120 of code along the left hand side of the figure and comments along the right hand side of the figure. FIG. 11D illustrates display 1125 of code along the left hand side of the figure and comments along the right hand side of the figure.

An embodiment of the invention can employ a documentation application for providing documentation consistent with an informal or formal interface. If desired, the documentation application can make use of templates or other techniques to provide documentation to users via an informal interface or a formal interface.

FIG. 11E illustrates an exemplary documentation template 1130 that can be used for a class with a formal interface in an embodiment of the invention. Template 1130 may include regions or fields for a package name, class hierarchy, mixin classes, a description, a constructor, properties, methods, events, revision history, and related information, e.g., links.

Other implementations of template 1130 can include more fields/regions or fewer fields regions without departing from the spirit of the invention.

Figure 11F:
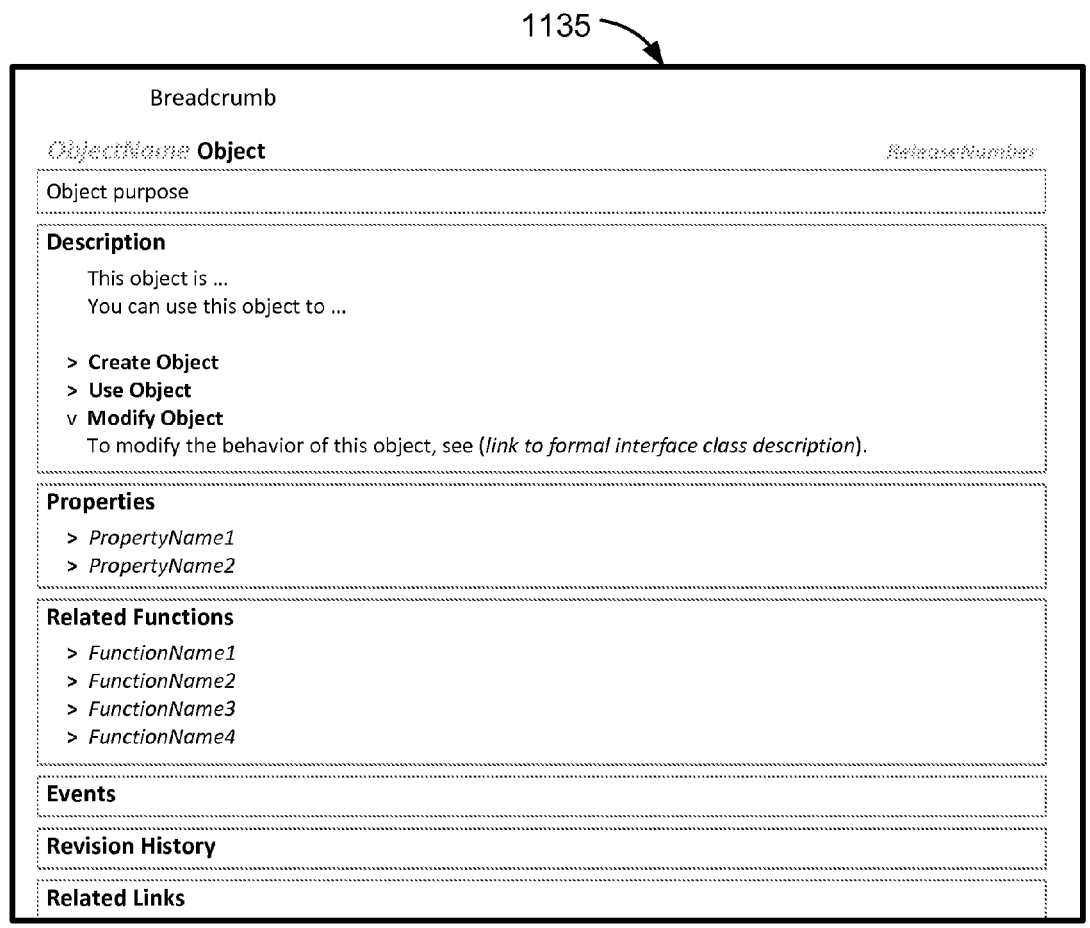
FIG. 11F illustrates an exemplary documentation template for use with an object for use with an informal interface.

FIG. 11F illustrates an exemplary documentation template 1135 that can be used for a class with an informal interface in an embodiment of the invention. Template 1135 can include regions or fields for object names, object descriptions, object properties, related functions, events, revision histories, and related links. Other implementations of template 1135 can include more fields/regions or fewer fields regions without departing from the spirit of the invention.

FIG. 11G illustrates an exemplary documentation template 1140 that can be used for an ordinary routine with an informal interface in an embodiment of the invention. Template 1140 can include regions or fields for an ordinary function name, function syntax, description information, examples, input arguments and other arguments, revision histories, and related links. Other implementations of template 1140 can include more fields/regions or fewer fields regions without departing from the spirit of the invention.

Figure 12:
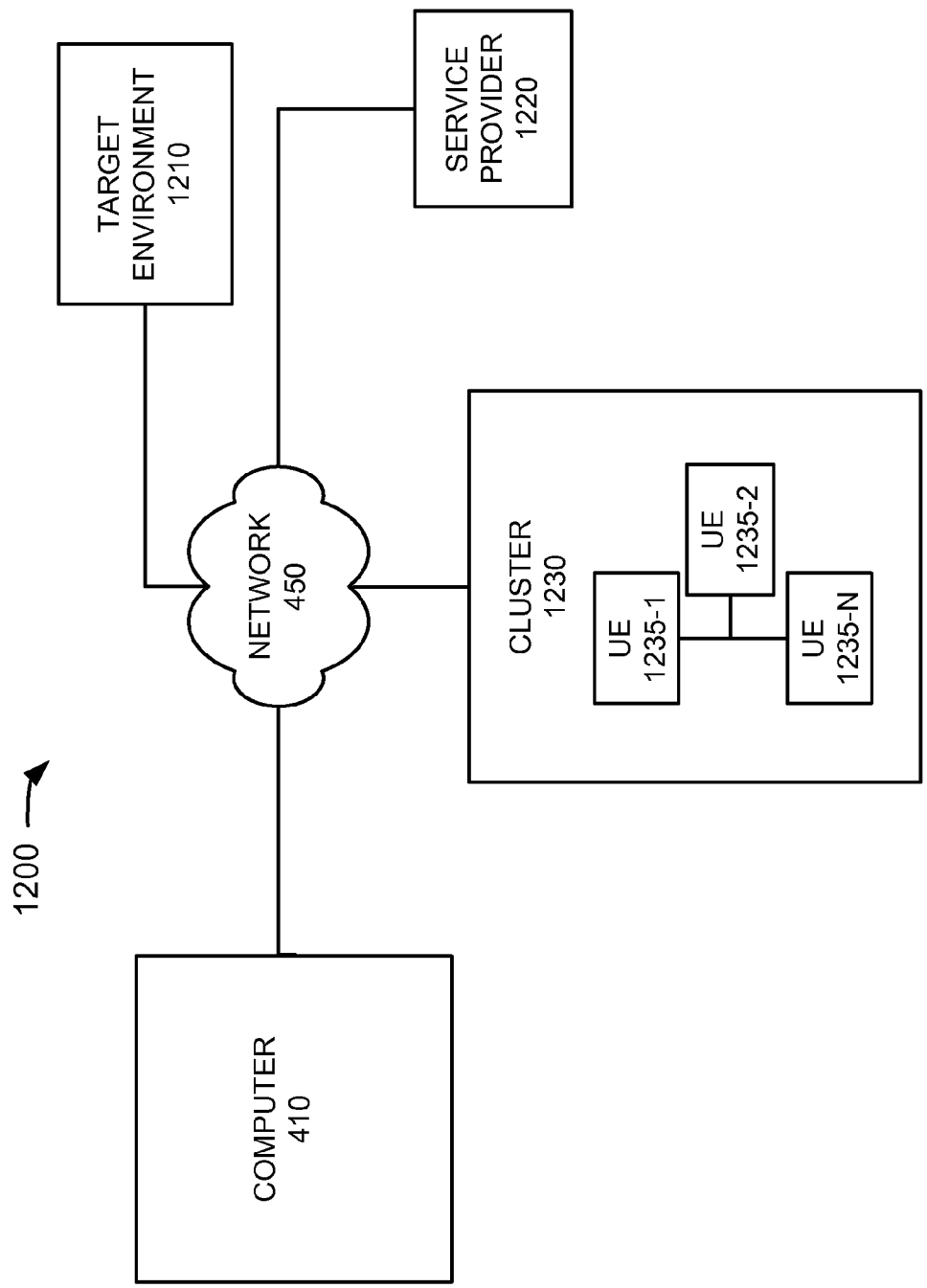
FIG. 12 illustrates an exemplary distributed processing environment that can be used for practicing aspects of the invention.

FIG. 12 illustrates an exemplary distributed environment 1200 in which systems and/or techniques described herein may be implemented. Referring to FIG. 12, environment 1200 may contain various entities including computer 410, network 450, target environment 1210, service provider 1220, and cluster 1230. It is noted that distributed environment 1200 is just one example of a distributed environment that may be used with embodiments of the invention. Other distributed environments may be used with embodiments of the invention and may contain more entities, fewer entities, entities in arrangements that differ from the arrangement illustrated in FIG. 12, etc. Moreover, distributed environments consistent with the principles of the invention may be configured to implement various "cloud computing" frameworks.

Details of computer 410 and network 450 were described above with respect to FIG. 4. In distributed environment 1200, computer 410 may be configured to, among other things, exchange information (e.g., data) with other entities in environment 1200 (e.g., target environment 1210, service provider 1220, and cluster 1230). Computer 410 may interface with the network 450 via communication interface 580.

Target environment 1210 may be configured to execute and/or interpret a compiled version of a code, such as code from a model, which may be generated in or otherwise available to the distributed environment 1200.

Service provider 1220 may include logic that makes a service available to another entity in distributed environment 1200. Service provider 1220 may also include a server operated by, for example, an individual, a corporation, an educational institution, a government agency, etc., that provides one or more services to a destination, such as computer 410.

The services may include providing software containing computer-executable instructions that implement one or more embodiments of the invention or portions thereof, and may be executed, in whole or in part, by (1) a destination (e.g., computer 410), (2) service provider 1220 on behalf of the destination, or (3) some combination thereof.

For example, in an embodiment, service provider 1220 may provide one or more subscription-based services to various customers. The services may be accessed by a customer via network 450. The customer may access the services using a computer system, such as computer 410. The services may implement one or more embodiments of the invention or portions thereof. Service provider 1220 may limit access to certain services based on, e.g., a customer service agreement between the customer and service provider 1220.

For example, the service agreement may allow the customer to access the services that may allow the customer to build, execute, and/or analyze code (e.g., code for a model of a physical system design), make use of a service that supports an informal interface and a formal interface, etc., as described above.

Cluster 1230 may include a number of units of execution (UEs) 1235 that may perform processing consistent with one or more embodiments of the invention or portions thereof. UEs 1235 may be software-based or hardware-based and may reside on a single device or chip or on multiple devices or chips. For example, UEs 1235 may be implemented in a single ASIC or in multiple ASICs. Likewise, UEs 1235 may be implemented in a single computer system or multiple computer systems. Other examples of UEs 1235 may include FPGAs, complex programmable logic devices (CPLDs), application specific integrated processors (ASIPs), processors, multiprocessor systems-on-chip (MPSoCs), graphic processing units (GPUs), microprocessors, etc. UEs 1235 may be configured to perform operations on behalf of another entity. Service provider 1220 may configure cluster 1230 to provide, for example, the above-described services to computing computer 410 on a subscription basis (e.g., via a web service).

CONCLUSION

Exemplary embodiments provide a computer-implemented technique for implementing and using a formal interface and an informal interface for interacting with an application, such as TCE.

The foregoing description of implementations provides illustration and description, but is not intended to be exhaustive or to limit the invention to the precise form disclosed. Modifications and variations are possible in light of the above teachings or may be acquired from practice of the invention.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more operations. This logic may include hardware, such as an application specific integrated circuit or a field programmable gate array, software, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
grouping a plurality of routines associated with an application to form a group of first routines and a group of second routines,
grouping the plurality of routines being performed by a computer;
associating the group of first routines with a first category of users and the group of second routines with a second category of users,
associating the group of first routines with the first category of users and the group of second routines with the second category of users being performed by the computer;
determining whether a user, accessing the application, is associated with the first category of users or the second category of users,
determining whether the user is associated with the first category of users or the second category of users being performed by the computer;
providing, when the user is associated with the first category of users, an informal interface using the computer, the informal interface enabling the user to access the group of first routines using an informal input format;
providing, when the user is associated with the second category of users, a formal interface using the computer, the formal interface enabling the user to access the group of second routines using a formal input format,
the group of second routines supporting developer functionality;
receiving, using the computer:
a first input complying with the informal input format, or
a second input complying with the formal input format;
processing, using the computer, the received first input or the received second input; and
performing, using the computer, a computing operation based on the processing.

2. The method of claim 1, where at least one of:
one or more of the first routines are an ordinary routine, or
one or more of the second routines are the ordinary routine, and
where at least one of:
the one or more of the first routines are a class routine, or
the one or more of the second routines are the class routine.

3. The method of claim 2, where the one or more second routines are the class routine, the method further comprising:
providing informal interface functionality access to the second routines by associating a first routine, of the group of first routines, with the one or more second routines.

4. The method of claim 2, where an input format for scoping specifies:
global routines for the informal input format, and
package routines for the formal input format.

5. The method of claim 4, where an input format for naming ordinary routines, instance methods, and static methods specifies:
camelCase full for the formal input format, and
camelCase full, lowercase full, or lowercase short for the informal input format.

6. The method of claim 5, where an input format for naming classes and constructor methods specifies:
MixedCase full for the formal input format, and
camelCase full, lowercase full, or lowercase short for the informal input format.

7. The method of claim 2, where an input format for naming ordinary routines, instance methods, and static methods specifies:
camelCase full for the formal input format, and
camelCase full, lowercase full, or lowercase short for the informal input format.

8. The method of claim 2, where an input format for naming classes and constructor methods specifies:
MixedCase full for the formal input format, and
camelCase full, lowercase full, or lowercase short for the informal input format.

9. The method of claim 1, where classes are included in packages for implementing functionality of the formal interface.

10. The method of claim 1, where:
classes are included in packages for implementing formal interface functionality; and
an ordinary routine in a global name space provides informal interface functionality access to a class in one or more of the packages.

11. The method of claim 1, further comprising:
providing class reference information using the computer;
associating informal interface functionality with a first template for the class reference information;
associating formal interface functionality with a second template for the class reference information;
providing a documentation application,
the documentation application including the class reference information for the informal interface functionality and the class reference information for the formal interface functionality;
accessing the documentation application using the first template,
the first template to access the class reference information for use with the informal interface functionality; and
accessing the documentation application using the second template,
the second template to access the class reference information for use with the formal interface functionality.

12. The method of claim 1, further comprising:
providing a first object display routine and a second object display routine for an object,
where:
the first object display routine causes a display of informal object information for the informal interface, and
the second object display routine causes a display of formal object information for the formal interface.

13. The method of claim 1, where:
informal interface functionality is associated with informal interface documentation,
the informal interface documentation employing a functional style of calling methods, and
formal interface functionality is associated with formal interface documentation,
the formal interface documentation employing the functional style of calling methods or a dot method invocation style of calling methods.

14. The method of claim 1, where the informal interface or the formal interface includes mixin classes,
the mixin classes representing a behavior or a capability for use with the computer.

15. The method of claim 14, where the mixin classes are named using adjectives.

16. The method of claim 1, further comprising:
specifying that property names are represented using MixedCase full names.

17. The method of claim 1, further comprising:
using a term called "method" in property names when a corresponding property represents an algorithm selection.

18. The method of claim 1, further comprising:
specifying that subpackage names should use lower case short names.

19. The method of claim 1, further comprising:
providing informal interface functionality to the computer using a wrapper.

20. The method of claim 19, where the wrapper provides informal interface functionality to the formal interface for providing the informal interface functionality.

21. The method of claim 1, further comprising:
employing a naming convention for routines, of the plurality of routines, that specifies that a verb or a verb phrase is used to name a routine that performs an action;
the employing allowing empty verbs to be omitted to produce a noun or a noun phrase.

22. The method of claim 1, further comprising:
specifying that a conversion routine name includes the digit 2 in the conversion routine name.

23. The method of claim 1, further comprising:
specifying that names including abutting acronyms are undesirable for use with routines included in the group of second routines.

24. The method of claim 1, further comprising:
specifying that MixedCase full names are to be used for identifying classes when the classes are used in packages.

25. The method of claim 1, further comprising:
specifying that names for root packages match root folder names associated with the root packages.

26. The method of claim 1, where the processing comprises:
processing the received first input or the received second input using a just-in-time (JIT) compiler.

27. A computer, comprising:
a memory to:
store first routines, and
store second routines; and
a processor to:
associate the first routines with a first category of users and the second routines with a second category of users,
determine whether a user is associated with the first category of users or the second category of users,
provide, when the user is associated with the first category of users, an informal interface using the computer,
the informal interface enabling the user to access the first routines using an informal input format,
provide, when the user is associated with the second category of users, a formal interface using the computer,
the formal interface enabling the user to access the second routines using a formal input format, and
the second routines supporting developer functionality,
receive:
a first input having a first routine input format,
the first routine input format complying with the informal input format, or
a second input having a second routine input format,
the second routine input format complying with the formal input format;
process the received first input or the received second input, and
perform a computing operation based on the processing.

28. A non-transitory computer-readable medium storing instructions, the instructions comprising:
one or more instructions that, when executed by one or more processors of a device, cause the one or more processors to:
group routines associated with an application to form a group that includes first routines and a group that includes second routines;
associate the first routines with a first category of users and the second routines with a second category of users;
determine whether a user is associated with the first category of users or the second category of users,
provide, when the user is associated with the first category of users, an informal interface using a computer,
the informal interface enabling the user to access the first routines using an informal input format;
provide, when the user is associated with the second category of users, a formal interface using the computer,
the formal interface enabling the user to access the second routines using a formal input format, and
the second routines supporting developer functionality;
receive:
a first input having a first routine input format,
the first routine input format complying with the informal input format, or
a second input having a second routine input format,
the second routine input format complying with the formal input format;
process the received first input or the received second input; and
perform a computing operation based on the processing.

29. The method of claim 12, where the first object display routine is a method of the object, and
where the second object display routine is a method of the object or an ordinary routine.

30. The method of claim 12, where the second object display routine is a method of the object,
the method of the object being implemented as an ordinary function.

31. The method of claim 1, where the informal interface supports informal interface functionality, the method further comprising:
associating the informal interface functionality with informal interface documentation;
referring to a term "functions", in the informal interface documentation, when referencing methods;
associating the developer functionality with formal interface documentation; and
referring to, in the formal interface documentation, using:
the term "methods" when referencing methods,
the term "classes" when referencing classes, and
the term "constructors" when referencing constructors.

32. The method of claim 1, where:
one or more first routines, of the group of the first routines, are an ordinary routine and a majority of the ordinary routines are included in a global namespace for providing informal interface functionality to the computer, and one or more of second routines, of the group of second routines, are:
   an ordinary routine provided in a package, or
   a class routine,
      the class routine including one or more of constructor methods, instance methods, or static methods.

33. The method of claim 6, further comprising:
specifying that property names are represented as MixedCase full names.

34. The method of claim 8, further comprising:
specifying that MixedCase full names are used for identifying classes when classes are used in packages.

* * * * *